(12) United States Patent
Iwamoto et al.

(10) Patent No.: US 8,065,524 B2
(45) Date of Patent: Nov. 22, 2011

(54) AUTHENTICATION PROCESSING APPARATUS AND AUTHENTICATION PROCESSING METHOD

(75) Inventors: Kiyotaka Iwamoto, Kyoto (JP); Eiichi Moriyama, Osaka (JP); Ryogo Yanagisawa, Osaka (JP); Isamu Ishimura, Kyoto (JP)

(73) Assignee: Panasonic Corporation, Osaka (JP)

( * ) Notice: Subject to any disclaimer, the term of this patent is extended or adjusted under 35 U.S.C. 154(b) by 858 days.

(21) Appl. No.: 11/677,742

(22) Filed: Feb. 22, 2007

(65) Prior Publication Data

US 2007/0208939 A1 Sep. 6, 2007

(30) Foreign Application Priority Data

Mar. 3, 2006 (JP) ................... 2006-058253

(51) Int. Cl.
*H04L 9/32* (2006.01)
*H04N 7/167* (2006.01)

(52) U.S. Cl. ............ 713/168; 380/201; 726/29; 726/34; 705/57; 725/31

(58) Field of Classification Search .......... 713/168–171; 380/200, 201; 726/26, 27, 29, 31, 34; 705/51, 705/57; 725/25, 31
See application file for complete search history.

(56) References Cited

U.S. PATENT DOCUMENTS

| | | | |
|---|---|---|---|
| 4,633,385 A | 12/1986 | Murata et al. | |
| 6,914,637 B1 | 7/2005 | Wolf et al. | |
| 7,088,398 B1 | 8/2006 | Wolf et al. | |
| 7,120,771 B2 * | 10/2006 | Dahan et al. | 711/163 |
| 7,237,081 B2 | 6/2007 | Dahan et al. | |
| 7,398,547 B2 * | 7/2008 | deCarmo | 726/3 |
| 7,412,053 B1 * | 8/2008 | Lyle | 380/2 |
| 7,890,753 B2 | 2/2011 | Dahan et al. | |
| 2003/0140205 A1 | 7/2003 | Dahan et al. | |
| 2003/0140244 A1 | 7/2003 | Dahan et al. | |
| 2003/0140245 A1 | 7/2003 | Dahan et al. | |
| 2004/0006713 A1 | 1/2004 | Minemura | |
| 2004/0059685 A1 | 3/2004 | Sakamura et al. | |
| 2004/0123118 A1 | 6/2004 | Dahan et al. | |
| 2005/0044248 A1 | 2/2005 | Mihira et al. | |
| 2005/0050325 A1 * | 3/2005 | Ohkubo | 713/168 |
| 2005/0066356 A1 * | 3/2005 | Stone et al. | 725/31 |
| 2005/0154917 A1 * | 7/2005 | deCarmo | 713/201 |
| 2007/0192599 A1 * | 8/2007 | Kato et al. | 713/168 |

FOREIGN PATENT DOCUMENTS

| | | |
|---|---|---|
| JP | 59-202507 | 11/1984 |
| JP | 3-82232 | 4/1991 |
| JP | 2004-199693 | 7/2004 |
| JP | 2005-56393 | 3/2005 |
| JP | 2005-514836 | 5/2005 |
| JP | 2005-269135 | 9/2005 |

OTHER PUBLICATIONS

English Language Abstract of JP 2005-269135.

* cited by examiner

*Primary Examiner* — Zachary A Davis
(74) *Attorney, Agent, or Firm* — Greenblum & Bernstein, P.L.C.

(57) ABSTRACT

An authentication processing apparatus includes an authentication unit, having a circuit that performs authentication phases included in processing for authenticating an external device. A command holding unit holds a first command that indicates whether or not each of the authentication phases is performed by the authentication unit. An authentication controller causes the authentication unit to perform an authentication phase that is indicated, by the first command, to be performed by the authentication unit. A CPU performs software processing of an authentication phase that is indicated, by the first command, not to be performed by the authentication unit.

10 Claims, 11 Drawing Sheets

FIG. 3

| 0 | Phase 1a |
| --- | --- |
| 1 | Phase 1b |
| 2 | Phase 1c |
| 3 | Phase 1d |
| 4 | Phase 1e |
| 5 | Phase 1f |
| 6 | Phase 1g |
| 7 | Phase 1h |
| 8 | Phase 2a |
| 9 | Phase 2b |
| 10 | Phase 2c |
| 11 | Phase 2d |
| 12 | Phase 2e |
| 13 | Phase 3a |
| 14 | Phase 3b |
| 15 | Phase 3c |
| 16 | Delay 1a - 1b |
| 17 | Delay 1b - 1c |
| 18 | Delay 1c - 1d |
| 19 | Delay 1d - 1e |
| 20 | Delay 1e - 1f |
| 21 | Delay 1f - 1g |
| 22 | Delay 1g - 1h |
| 23 | Delay 2a - 2b |
| 24 | Delay 2b - 2c |
| 25 | Delay 2c - 2d |
| 26 | Delay 2d - 2e |
| 27 | Delay 3a - 3b |
| 28 | Delay 3b - 3c |
| 29 | 0 clock |
| 30 | 9 clocks |
| 31 | 18 clocks |

FIG. 4

| Delay 1a - 1b | 255 |
| --- | --- |
| Delay 1b - 1c | 255 |
| Delay 1c - 1d | 64 |
| Delay 1d - 1e | 0 |
| Delay 1e - 1f | 0 |
| ⋮ | ⋮ |
| Delay 3a - 3b | 0 |
| Delay 3b - 3c | 0 |

AUTHENTICATION PROCESSING APPARATUS AND AUTHENTICATION PROCESSING METHOD

BACKGROUND OF THE INVENTION (1) Field of the Invention

The present invention relates to an authentication processing apparatus and an authentication processing method, and particularly to an authentication processing apparatus that performs processing for authenticating a device.

(2) Description of the Related Art

In recent years, High-Definition Multimedia Interface (HDMI) communication has been used to transmit audio and video data from a sending device such as a DVD player to a receiving device such as a television receiver. In HDMI communication, device authentication specified by the High-bandwidth Digital Content Protection (HDCP) standard is performed for copyright protection of such audio and video data.

The HDCP standard is a standard for protecting transmission of content between a sending device which encrypts and sends the content and a receiving device which receives and decrypts the content. According to the HDCP standard, the sending device authenticates the receiving device using an authentication protocol. The sending device sends the encrypted content to the receiving device based on a secret key previously shared by both devices in the device authentication. In addition, in order to keep the integrity of the HDCP-compliant system for a long time, the sending device revokes a device exposed to risk on the system. Device authentication in the HDCP standard is performed via Inter-Integrated Circuit (IIC) communication such as Display Data Channel (DDC) communication.

FIG. 1 is a block diagram which shows a structure of a conventional HDMI communication system in which device authentication is performed according to the HDCP standard. An HDMI communication system shown in FIG. 1 includes a sending device 1100 such as a DVD player and a receiving device 1200 such as a television receiver. The sending device 1100 and the receiving device 1200 are connected to each other via an HDMI cable 1300.

The sending device 1100 includes a CPU 1110 and an HDMI sending unit 1120. The CPU 1110 controls the sending device 1100 including the HDMI sending unit 1120. The HDMI sending unit 1120 is an LSI which sends audio and video data to the receiving device 1200, and includes a DDC unit 1127. The audio and video data are sent from the HDMI sending unit 1120 to the receiving device 1200 in one direction via the HDMI cable 1300.

The DDC unit 1127 performs two-way DDC communication with the receiving device 1200 via the HDMI cable 1300.

In the conventional HDMI communication system structured as mentioned above, the sending device 1100 performs authentication of the receiving device 1200 through software processing by the CPU 1110. However, since in the conventional sending device 1100, the CPU 1110 performs device authentication, it may be unable to perform high-speed authentication depending on its operational status. In the conventional system, data is sent between the CPU 1110 and the DDC unit 1127 via the DDC communication. However, in the DDC communication, since data is sent and received at a communication frequency of approximately 100 kHz, the data cannot be sent at high speed between the CPU 1110 and the DDC unit 1127.

In order to solve these problems, Japanese Laid-open Patent Application No. 2005-269135 describes a technique for executing a part of HDCP-compliant device authentication using a dedicated circuit. HDCP-compliant device authentication is the processing specified by the HDCP standard, and the processing can be performed using a circuit composed of hardware.

SUMMARY OF THE INVENTION

However, although device authentication which is compliant with the HDCP standard is the processing specified by the HDCP standard, the processing timing may vary depending on the specifications of the receiving device. If HDCP-compliant device authentication processing is performed by hardware as shown in the above Japanese Laid-open Patent Application No. 2005-269135, such authentication processing is actually speeded up. However, proper device authentication may be unable to be performed depending on the specifications of the receiving device.

For example, a problem occurs such that when the processing speed of the receiving device is slow, proper device authentication cannot be performed without inserting a delay during the device authentication processing.

In view of the above, it is an object of the present invention to provide an authentication processing apparatus and an authentication processing method which allow high-speed processing and support various types of receiving devices.

In order to achieve the above object, the authentication processing apparatus according to the present invention includes: an authentication unit having a circuit that performs authentication phases included in processing for authenticating an external device; a command holding unit which holds a first command that indicates whether or not to perform each of the authentication phases; and an authentication control unit which causes the authentication unit to perform an authentication phase that is indicated by the first command as an authentication phase which is to be performed.

With this structure, the authentication processing apparatus of the present invention is capable of performing an arbitrary authentication phase out of plural authentication phases included in authentication processing, by selectively using a dedicated circuit composed of hardware included in the authentication unit according to the first command held in the command holding unit. Therefore, if there is an authentication phase which is inappropriate for hardware processing due to an external device (receiving device) to be authenticated, it is possible to perform the authentication phase by software processing. This enables the authentication processing apparatus of the present invention to flexibly support an external device even if proper authentication cannot be performed on the external device by simple hardware processing. In addition, since the authentication unit performs an arbitrary authentication phase included in authentication processing by hardware processing, it is possible to speed up the authentication processing compared with performing all the authentication phases by software processing. Therefore, the authentication processing apparatus of the present invention can perform high-speed processing and support various types of receiving devices. It should be noted that hardware processing means processing which uses a circuit composed of hardware, while software processing means processing performed by a program executed by a CPU or the like.

In the above apparatus, the first command may include a plurality of bits, each corresponding to one of the authentication phases. Each of the bits included in the first command indicates whether or not the corresponding authentication phase is to be performed by the authentication unit. The authentication control unit may cause the authentication unit to perform the authentication phase that is indicated, by the corresponding bit included in the first command held in the command holding unit, as an authentication phase which is to be performed.

With this structure, the authentication processing apparatus of the present invention can perform a specified authentication phase according to 1-bit information which is included in the first command and corresponds to each authentication phase. Therefore, it is possible to select, according to a single command, a specified authentication phase out of plural authentication phases. In other words, it is possible to control the authentication processing apparatus according to a simple command.

The authentication processing apparatus may further include a data holding unit which holds, for a subsequent authentication phase, authentication data generated in an authentication phase performed by the authentication unit.

With this structure, authentication data generated in the authentication phase performed by the authentication unit is held in the data holding unit. Therefore, it is possible for the CPU or the like which performs software processing to read the authentication data held in the data holding unit and perform the authentication phases subsequent to the authentication phase performed by the authentication processing apparatus.

The authentication unit may read, from the data holding unit, authentication data generated in a previous authentication phase, and perform an authentication phase using the authentication data.

With this structure, the authentication processing apparatus of the present invention can read the authentication data generated in the authentication phase performed by the CPU or the like and perform the subsequent authentication phase using the read authentication data.

The authentication processing apparatus may further include a central processing unit (CPU) which perform software processing of an authentication phase that is indicated, by the first command held in the command holding unit, as an authentication phase which is not to be performed by the authentication unit. The data holding unit may hold, for a subsequent authentication phase, authentication data generated in the authentication phase performed by the CPU, and the CPU may read, from the data holding unit, authentication data generated in a previous authentication phase, and perform software processing on an authentication phase using the authentication data.

With this structure, the authentication unit can perform, by hardware processing, the authentication phases subsequent to the authentication phase performed by the CPU by software processing, using the authentication data held in the data holding unit. In addition, the CPU can perform, by software processing, the authentication phases subsequent to the authentication phase performed by the authentication unit by hardware processing, using the authentication data held in the data holding unit. Therefore, the authentication processing apparatus of the present invention can perform each authentication phase by selectively using hardware processing and software processing easily depending on the specifications of an external device (receiving device).

The authentication processing apparatus may further include a display data channel (DDC) communication unit which performs DDC communication with the external device, and the authentication unit may send and receive data to and from the external device via the DDC communication unit.

With this structure, the authentication processing apparatus of the present invention can perform DDC communication with an external device (receiving device). Furthermore, in the authentication processing through the DDC communication, the authentication processing apparatus of the present invention can not only perform high-speed processing using hardware processing but also support various types of receiving devices.

The command holding unit may hold a second command that indicates whether or not to reset a DDC communication line with the external device, and the DDC communication unit may include a reset generation unit which generates a signal for resetting the DDC communication line based on the second command held in the command holding unit.

With this structure, the authentication processing apparatus of the present invention can reset the DDC communication line when DDC communication is performed with an external device (receiving device) for the processing of each authentication phase. Therefore, it is possible to stabilize the DDC communication with the receiving device.

The command holding unit may hold a third command that indicates whether or not to insert delay time into between the respective authentication phases. The authentication processing apparatus may further include a timer unit which counts the delay time, and the authentication control unit may insert the delay time counted by the timer unit between authentication phases indicated by the third command as authentication phases between which delay time is to be inserted.

With this structure, it is possible to insert an arbitrary delay (delay time) between respective authentication phases. Therefore, it is possible to perform authentication processing properly, even if proper authentication processing cannot be performed without a delay between authentication phases due to the specifications of an external device (receiving device). Accordingly, the authentication processing apparatus of the present invention can support various types of receiving devices. In addition, hardware processing can also be performed on the authentication phases between which a delay needs to be inserted, which allows high-speed processing.

The authentication processing apparatus may further include a central processing unit (CPU) which performs software processing on an authentication phase that is indicated, by the first command held in the command holding unit, as an authentication phase which is not to be performed by the authentication unit.

With this structure, it is possible to perform, by software processing, the authentication phase which cannot be properly performed by hardware processing.

The authentication processing apparatus may further include: a storage unit which stores device information that identifies the external device and the first command that corresponds to the external device; a device information acquisition unit which acquires the device information of the external device to be authenticated; and a device information control unit which reads, from the storage unit, the first command that corresponds to the device information acquired by the device information acquisition unit, and writes the first command into the command holding unit.

With this structure, the storage unit stores the first command which is best for the specifications of the external device (receiving device). Therefore, it is possible, by reading the best first command, to easily judge the processing pattern (assignment of either hardware processing by the authentication unit or software processing by the CPU or the like to each authentication phase) which is best for the external device, and thus to perform the authentication processing using the best processing pattern.

The processing for authenticating the external device is processing which is compliant with the high-bandwidth digital content protection (HDCP) standard, and the authentication unit may include: a first authentication unit having a circuit that performs an authentication phase included in a first authentication process which is compliant with the HDCP standard; a second authentication having a circuit that performs an authentication phase included in a second authentication process which is compliant with the HDCP standard; and a third authentication unit having a circuit that performs an authentication phase included in a third authentication process which is compliant with the HDCP standard.

With this structure, the authentication processing apparatus of the present invention can perform HDCP-compliant authentication processing at high speed and support various types of receiving devices.

The authentication processing method according to the present invention is an authentication processing method used in an authentication processing apparatus including an authentication unit having a circuit that performs authentication phases included in processing for authenticating an external device and a command holding unit which holds a first command that indicates whether or not to perform each of the authentication phases, and this method includes: judging, based on the first command, whether or not to perform each of the authentication phases; and causing the authentication unit to perform an authentication phase that is judged in the judging as an authentication phase which is to be performed.

According to the authentication processing method of the present invention, it is possible to perform an arbitrary authentication phase out of plural authentication phases included in authentication processing, by selectively using a dedicated circuit composed of hardware included in the authentication unit according to the first command held in the command holding unit. Therefore, if there is an authentication phase which is inappropriate for hardware processing due to an external device (receiving device) to be authenticated, it is possible to perform the authentication phase by software processing. This enables the authentication processing method of the present invention to flexibly support an external device even if proper authentication cannot be performed on the external device by simple hardware processing. In addition, since the authentication unit performs an arbitrary authentication phase included in authentication processing by hardware processing, it is possible to speed up the authentication processing compared with performing all the authentication phases by software processing. Therefore, the authentication processing method of the present invention allows high-speed processing and supports various types of receiving devices.

The present invention can provide an authentication processing apparatus and an authentication processing method which allow high-speed processing and support various types of receiving devices.

FURTHER INFORMATION ABOUT TECHNICAL BACKGROUND TO THIS APPLICATION

The disclosure of Japanese Patent Application No. 2006-058253 filed on Mar. 3, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3 is a diagram which shows an example of the structure of a command register;

FIG. 4 is a diagram which shows an example of the structure of a timer register;

DESCRIPTION OF THE PREFERRED EMBODIMENT

The embodiment of the authentication processing apparatus according to the present invention will be described in detail with reference to the diagrams.

The authentication processing apparatus in the present embodiment selectively performs, by hardware processing, an arbitrary authentication phase out of authentication phases included in authentication processing. Therefore, it is possible to perform, by software processing, the authentication phases which cannot be properly performed by hardware processing. Thereby, the authentication processing apparatus of the present invention can support various types of receiving devices.

First, the structure of the authentication processing apparatus in the present embodiment is described.

Figure 1:
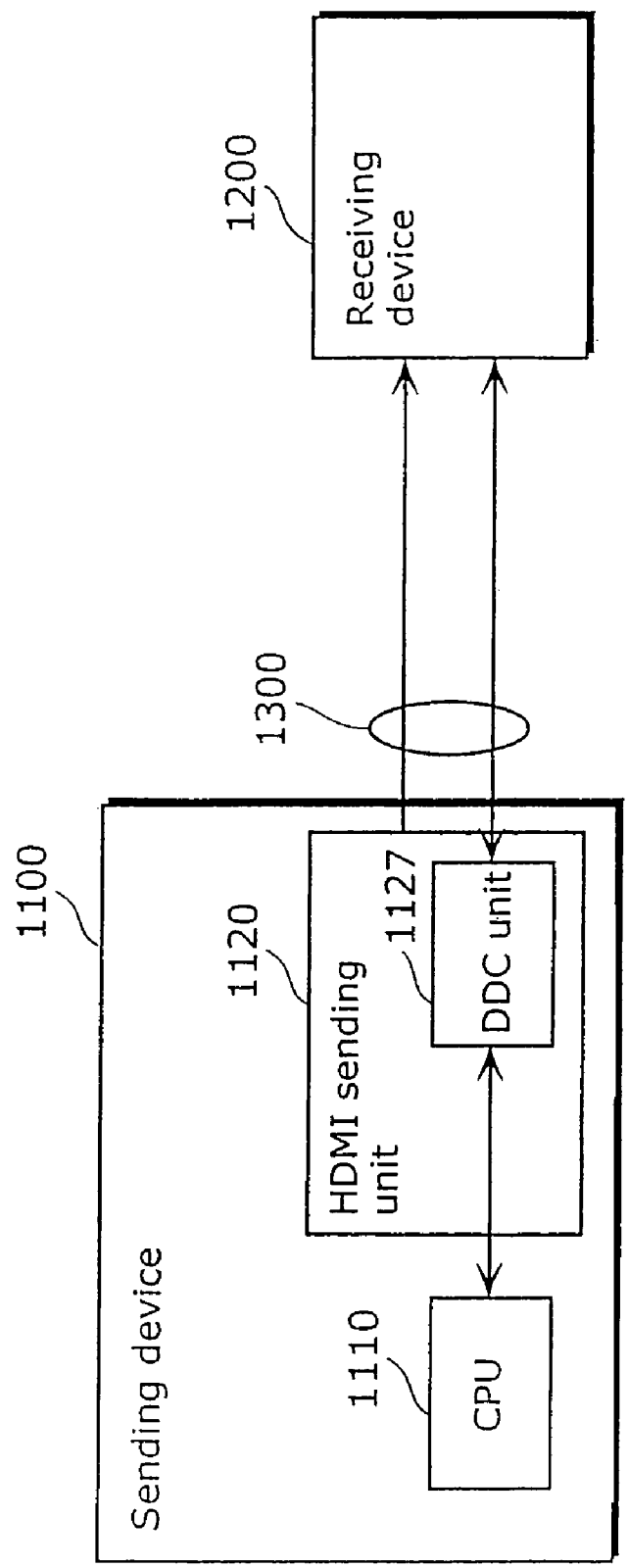
FIG. 1 is a block diagram which shows the structure of a conventional HDMI communication system.
Figure 2:
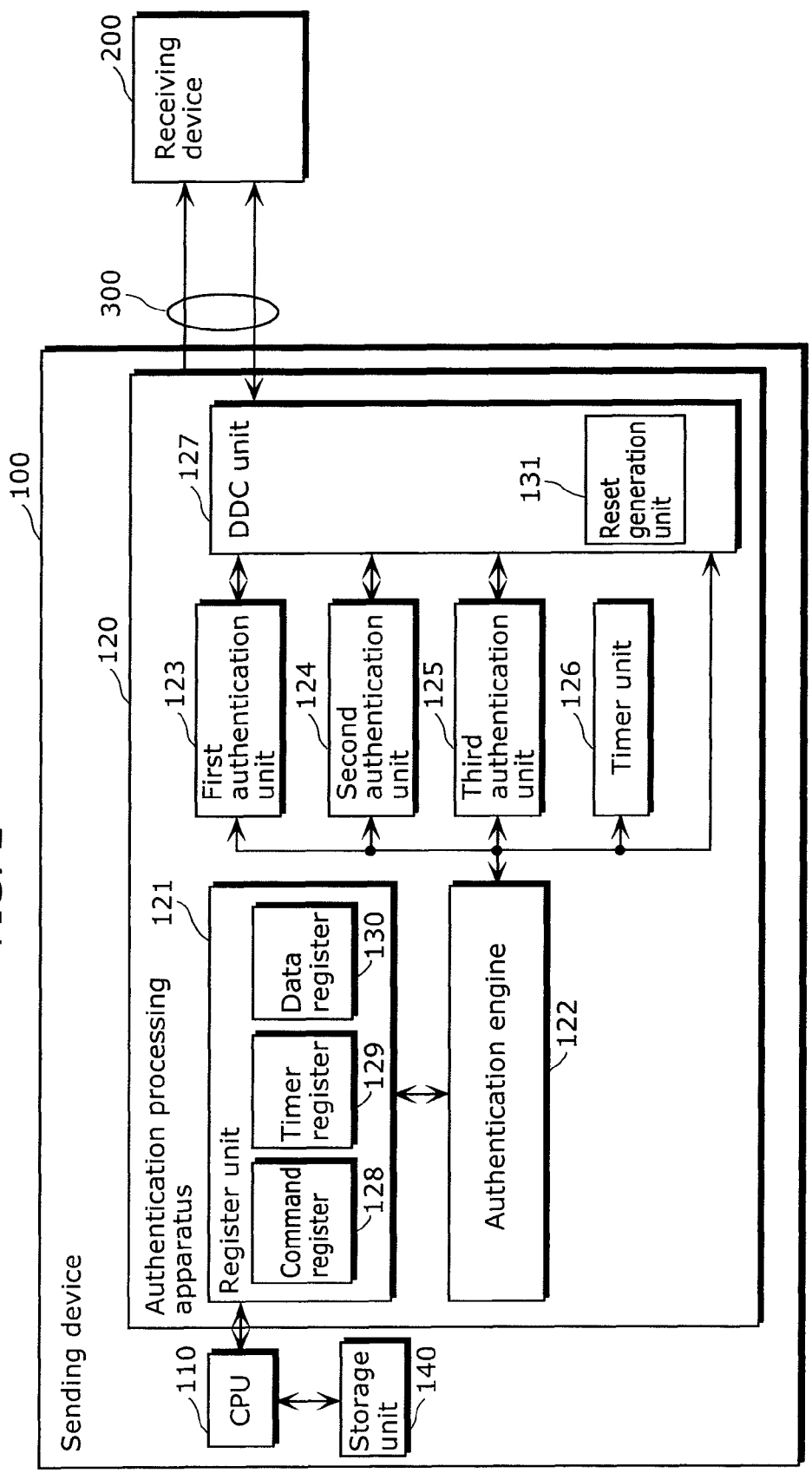
FIG. 2 is a block diagram which shows the structure of an HDMI communication system in an embodiment of the present invention.

FIG. 2 is a block diagram which shows the structure of an HDMI communication system including the authentication processing apparatus of the present embodiment.

The HDMI communication system shown in FIG. 2 includes a sending device 100 such as a DVD player and a receiving device 200 such as a television receiver. The sending device 100 and the receiving device 200 are connected to each other via an HDMI cable 300.

The sending device 100 sends audio and video data to the receiving device 200 via the HDMI cable 300. The sending device 100 performs DDC communication with the receiving device 200 via the HDMI cable 300. The sending device 100 performs device authentication, which is compliant with the HDCP standard, on the receiving device 200. The sending device 100 includes a CPU 110, an authentication processing apparatus 120, and a storage unit 140.

The CPU 110 controls the sending device 100 including the authentication processing apparatus 120 and the storage unit 140.

The authentication processing apparatus 120 is an LSI which performs device authentication processing which is compliant with the HDCP standard. The authentication processing apparatus 120 performs, by hardware processing, plural authentication phases included in the device authentication processing on the receiving device 200. The authentication processing apparatus 120 performs a part or all of the plural authentication phases based on an authentication command sent from the CPU 110. The authentication processing apparatus 120 includes a register unit 121, an authentication engine 122, a first authentication unit 123, a second authentication unit 124, a third authentication unit 125, a timer unit 126, and a DDC unit 127.

The register unit 121 is a register which holds the authentication command sent from the CPU 110. The register unit 121 includes a command register 128, a timer register 129 and a data register 130.

The command register 128 holds an authentication command which is sent from the CPU 110 and indicates whether or not to perform each of the authentication phases included in the authentication processing. The command register 128 also holds a command indicating whether or not to insert a delay between respective authentication phases included in the authentication processing, as well as a command indicating whether or not to reset the DDC communication line.

The timer register unit 129 holds timer information sent from the CPU 110. Here, timer information is information indicating an amount of delay (delay time) to be inserted between authentication phases, and is composed of plural bits.

The data register 130 holds authentication data (a key, a parameter, and so forth) generated in the processing of authentication phases.

The authentication engine 122 causes the first authentication unit 123, the second authentication unit 124 or the third authentication unit 125 to perform the processing of the authentication phases, based on the authentication command which is sent from the CPU 110 and held in the command register 128. The authentication engine 122 also controls the timer unit 126 and the DDC unit 127.

The first authentication unit 123 has a circuit composed of hardware which performs the processing of authentication phases included in the first authentication process which is compliant with the HDCP standard. Note that in the HDCP standard, three stages of authentication processing are performed: the first authentication; the second authentication and the third authentication. The second authentication unit 124 has a circuit composed of hardware which performs the processing of authentication phases included in the second authentication process which is compliant with the HDCP standard. The third authentication unit 125 has a circuit composed of hardware which performs the processing of authentication phases included in the third authentication process which is compliant with the HDCP standard.

The timer unit 126 counts delay time based on timer information held in the timer register 129.

The DDC unit 127 performs two-way DDC communication with the receiving device 200 via the HDMI cable 300. The DDC unit 127 includes a reset generation unit 131. The reset generation unit 131 generates a signal which resets a DDC communication line with the receiving device 200. The first authentication unit 123, the second authentication unit 124 or the third authentication unit 125 sends and receives data to and from the receiving device 200 via the DDC unit 127.

The storage unit 140 holds device information for identifying the type of a receiving device, an authentication command corresponding to the receiving device, and so forth. The storage unit 140 is, for example, a non-volatile storage element such as a flash memory.

Next, the structure of the command register 128 is described.

FIG. 3 is a diagram which shows the structure of the command register 128. As shown in FIG. 3, the command register 128 has 32 bits of data, for example. An authentication command held in the command register 128 includes plural bits which respectively correspond to plural authentication phases. Each bit of an authentication command indicates whether or not to perform the processing of the corresponding authentication phase. Bits 0 to 15 of the command register 128 each hold information indicating whether or not to perform hardware processing on each authentication phase of the first to third authentication processes. For example, when hardware processing is performed on each authentication phase, "1" is held in the corresponding register, while when hardware processing is not performed, "0" is held in the corresponding register. Here, each of the first to third authentication processes includes plural authentication phases, which will be described later in detail. The first authentication process includes eight authentication phases 1a to 1h, the second authentication process includes five authentication phases 2a to 2e, and the third authentication process includes three authentication phases 3a to 3c. The authentication engine 122 causes, based on the commands held in the bits 0 to 15 of the command register 128, the first authentication unit 123, the second authentication unit 124 or the third authentication unit 125 to execute a part or all of the authentication phases included in the authentication process.

Each of the bits 16 to 28 of the command register 128 holds a 1-bit command indicating whether or not to insert a delay (delay time) between respective authentication phases included in the authentication processing. For example, the bit 16 holds information indicating whether or not to insert a delay between the authentication phase 1a and the authentication phase 1b. The authentication engine 122 inserts a delay time counted by the timer unit 126 into between the authentication phases, based on each of the commands held in the bits 16 to 28 of the command register 128. For example, when "1" is held in the corresponding register, the authentication engine 122 inserts a delay between the corresponding authentication phases. When "0" is held in the corresponding register, the authentication engine 122 does not insert a delay between the corresponding authentication phases. The register shown in FIG. 3 does not include registers for delays to be inserted between the first and second authentication processes (between the authentication phases 1h and 2a) and the second and third authentication processes (between the authentication phases 2e and 3a), but such registers may be included.

The bits 29 to 31 of the command register 128 hold commands indicating whether or not to reset a DDC communication line with the receiving device 200 when the sending device 100 accesses the receiving device 200 during processing of an authentication phase. The reset generation unit 131 generates a reset command which resets the DDC communication line, based on the data held in the bits 29-31 of the command register 128. For example, the reset generation unit 131 does not issue a DDC reset command when "0 clock" in the bit 29 is "1", issues a 9-clock DDC reset command with each DDC access when "9 clocks" in the bit 30 is "1", and issues a 18-clock DDC reset command with each DDC access when "18 clocks" in the bit 31 is "1". It should be noted that a 9-clock DDC reset command is a command for resetting once the status of the DDC communication line with the receiving device 200, and a 18-clock DDC reset command is a command for issuing the 9-clock DDC reset command twice.

For example, when an authentication command "0x2000FFFF" is sent from the CPU 110 and held in the command register 128, the authentication processing apparatus 120 sequentially executes all the authentication phases because the bits 0 to 15 are all "1". Since the bit 29 is "1", the authentication processing apparatus 120 does not issue a DDC reset command when accessing the receiving device 200 via DDC communication. When an authentication command "0x8000E000" is sent from the CPU 110, the authentication processing apparatus 120 does not execute the first and second authentication processes and executes only the third authentication process because the bits 0 to 12 are "0" and the bits 13 to 15 are "1". Since the bit 31 is "1", the authentication processing apparatus 120 issues a 18-clock DDC reset command when accessing the receiving device 200 via DDC communication. When an authentication command "0x4003000F" is sent from the CPU 110, the authentication processing apparatus 120 executes only the authentication phases 1a to 1d because the bits 0 to 3 are."1" and the bits 4 to 16 are "0". Since the bits 16 and 17 are "1", the authentication processing apparatus 120 inserts delays between the authentication phases 1a and 1b and between the authentication phases 1b and 1c. Since the bit 30 is "1", the authentication processing apparatus 120 issues a 9-clock DDC reset command when accessing the receiving device 200 via DDC communication during processing of the phase.

As described above, the authentication processing apparatus 120 according to the present embodiment is capable of holding an authentication command sent from the CPU 110 in the command register 128 and selectively executing processing of an authentication phase included in authentication processing depending on the held authentication command. An authentication command includes 1-bit information corresponding to each authentication phase, which allows the authentication processing apparatus 120 to easily judge whether or not to execute an arbitrary authentication phase based on one command and thus selectively execute the arbitrary authentication phase. The authentication command also includes 1-bit information indicating whether or not to insert a delay between respective authentication phases. Therefore, the authentication processing apparatus 120 can easily judge whether or not to insert a delay between arbitrary authentication phases and thus actually insert the delay between them. The authentication command also includes information indicating whether or not to issue a DDC reset command to the receiving device 200. Therefore, the authentication processing apparatus 120 can easily judge whether or not to issue a DDC reset command and thus actually issue the DDC reset command to the receiving device 200.

FIG. 4 is a diagram which shows the structure of a timer register 129. As shown in FIG. 4, the timer register 129 is a register which holds amounts of delay corresponding to respective delays between authentication phases held in the bits 16 to 28 of the command register 128 shown in FIG. 3. For example, the timer register 129 holds 8-bit amounts of delay corresponding to respective delays between authentication phases. The timer register 129 shown in FIG. 4 holds "255" as amounts of delay between the authentication phases 1a and 1b and the authentication phases 1b and 1c respectively, and holds "64" as an amount of delay between the authentication phases 1c and 1d. When "1" is held in any of the bits 16 to 28 of the command register 128, the authentication engine 122 reads out the corresponding amount of delay held in the timer register 129, and causes the timer unit 126 to count the delay time based on the read amount of delay. The amount of delay held in the timer register 129 is sent, from the CPU 110, along with the authentication command held in the command register 128. It should be noted that the amounts of delay held in the timer register 129 are not limited to 8 bits and the number of bits needs only be two or more.

In FIG. 3, the command register 128 holds the following three types of commands: execution commands for respective authentication phases (bits 0 to 15), delay commands for between respective authentication phases (bits 16 to 28), and reset commands (bits 29 to 31). However, the command register 128 may hold only one or two of these three types of commands. The authentication processing apparatus 120 may include three separate command registers for: execution commands for respective authentication phases; delay commands for between respective authentication phases; and reset commands.

In FIG. 3, the command register 128 holds delay commands for between authentication phases (bits 16 to 28). However, it is acceptable that the command register 128 does not hold delay commands and the authentication engine 122 judges whether or not to insert a delay between authentication phases based on an amount of delay held in the timer register 129. More specifically, it is acceptable that when an amount of delay held in the timer register 129 is "0", the authentication engine 122 does not insert a delay between the corresponding authentication phases, and when an amount of delay held in the timer register 129 is other than "0", it inserts the delay time equivalent to the amount of delay between the corresponding authentication phases. Furthermore, when the command register 128 does not hold delay commands for between authentication phases (bits 16 to 28), the register unit 121 may hold plural bits of delay amounts in the command register 128 thereof, instead of the timer register 129.

Figure 5:
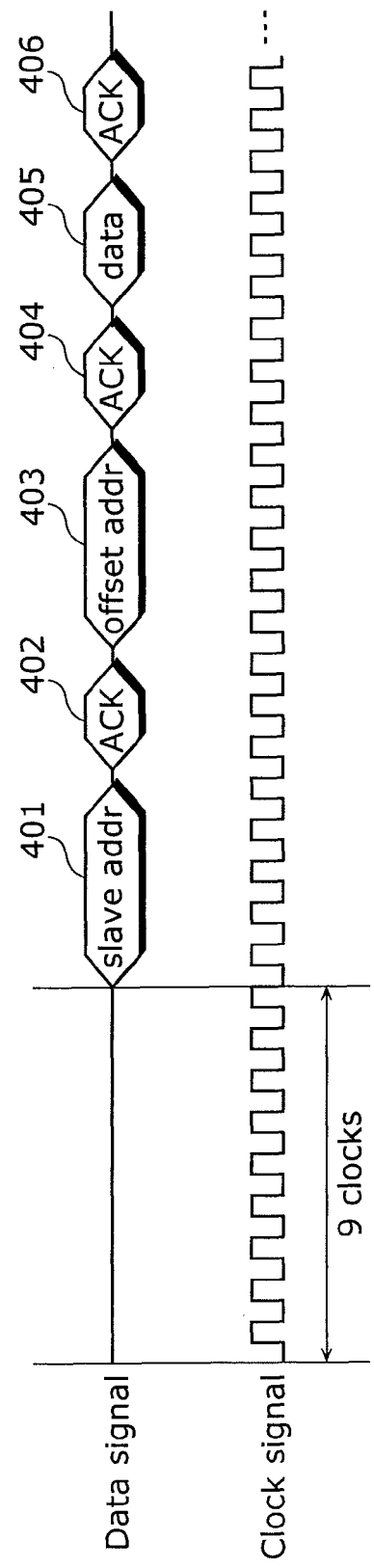
FIG. 5 is a diagram which shows an example of signals in DDC communication.

FIG. 5 is a diagram which schematically shows an example of signals sent when the sending device 100 writes data into the receiving device 200. As shown in FIG. 5, 9 clocks are input to a clock signal during the state where a data signal includes no data, and thus the state of the DDC communication line between the sending device 100 and the receiving device 200 is reset. Next, a slave address 401 for identifying a device is sent from the sending device 100 to the receiving device 200. When the receiving device 200 receives the slave address 401, the receiving device 200 sends an ACK 402 indicating reception of the slave address 401 to the sending device 100. Next, an offset address 403 which is an address within the device is sent from the sending device 100 to the receiving device 200, and upon receiving the offset address 403, the receiving device 200 sends an ACK 404 to the sending device 100. Next, data to be written is sent from the sending device 100 to the receiving device 200, and upon receiving the data, the receiving device 200 sends an ACK 406 to the sending device 100.

Next, a sequence of operations for authentication processing in the present embodiment will be described.

Figure 6:
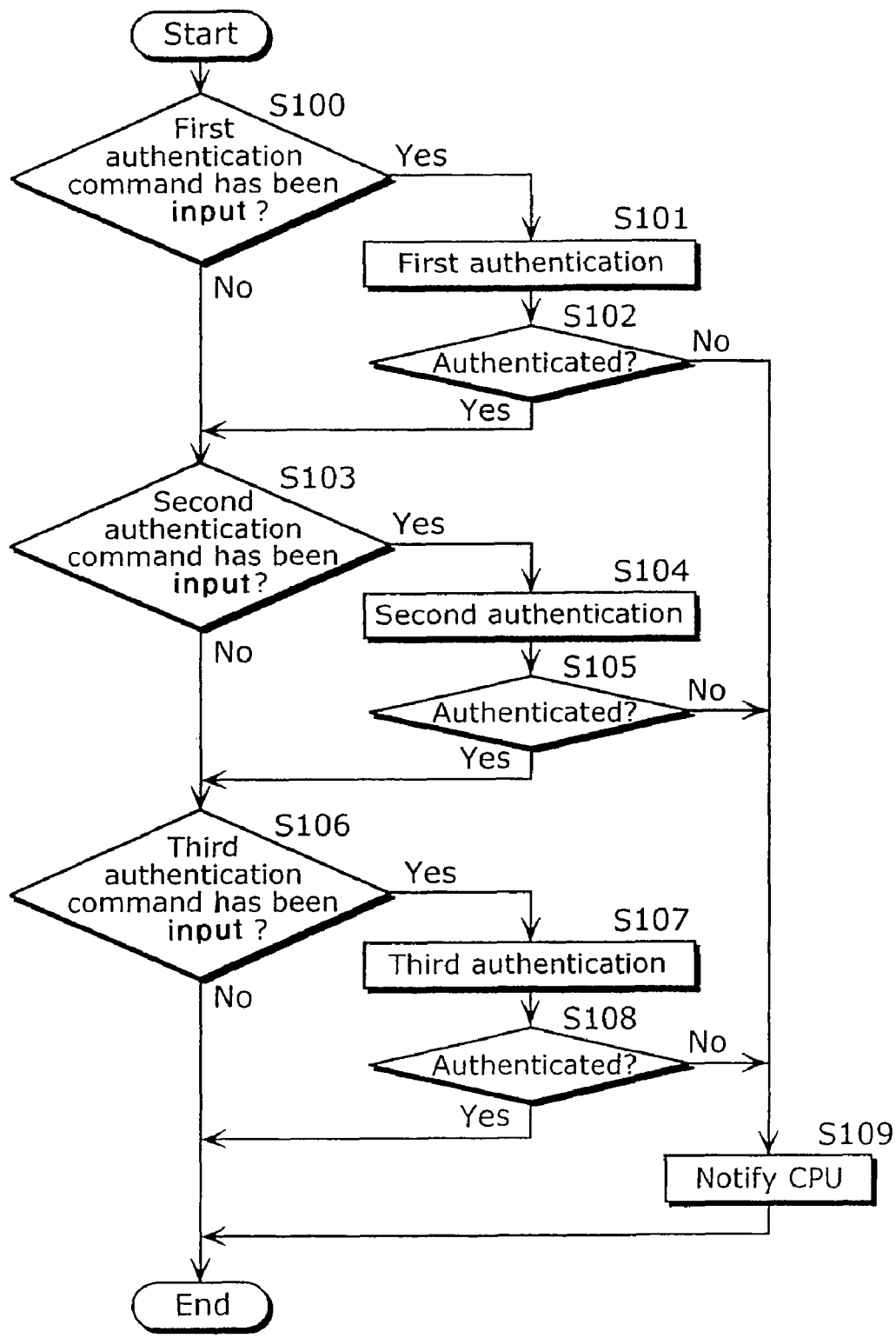
FIG. 6 is a flowchart which shows a flow of authentication processing in the present embodiment.

FIG. 6 is a flowchart which shows a flow of processing performed by the authentication engine 122 of the authentication processing apparatus 120 in the present embodiment.

As shown in FIG. 6, the authentication engine 122 first judges, based on the authentication command held in the command register 128, whether or not a command corresponding to the first authentication has been input. More specifically, the authentication engine 122 judges whether or not one or more "1"s are held in registers of the command register 128 (i.e., bits 0 to 7 of the command register 128) shown in FIG. 3 corresponding to the authentication phases included in the first authentication. When one or more "1"s are held in the registers of the command register 128 corresponding to the authentication phases included in the first authentication (Yes in S100), the first authentication unit 123 performs the first authentication process according to the instruction from the authentication engine 122 (S101).

When the authentication has succeeded in the first authentication process (Yes in S102), the authentication engine 122 judges, based on the authentication command held in the command register 128, whether or not a command corresponding to the second authentication has been input (Step S103). More specifically, the authentication engine 122 judges whether or not one or more "1"s are held in registers of the command register 128 (i.e., bits 8 to 12 of the command register 128) shown in FIG. 3 corresponding to the authentication phases included in the second authentication. When one or more "1"s are held in the registers of the command register 128 corresponding to the authentication phases included in the second authentication (Yes in S103), the second authentication unit 124 performs the second authentication process according to the instruction from the authentication engine 122 (S104).

When the authentication has succeeded in the second authentication process (Yes in S105), the authentication engine 122 judges, based on the authentication command held in the command register 128, whether or not a command corresponding to the third authentication has been input (Step S106). More specifically, the authentication engine 122 judges whether or not one or more "1"s are held in registers of the command register 128 (i.e., bits 13 to 15 of the command register 128) shown in FIG. 3 corresponding to the authentication phases included in the third authentication. When one or more "1"s are held in the registers of the command register 128 corresponding to the authentication phases included in the third authentication (Yes in S106), the third authentication unit 125 performs the third authentication process according to the instruction from the authentication engine 122 (S107). When the authentication has succeeded in the third authentication process (Yes in S108), the authentication processing is ended.

On the other hand, when one or more "1"s are not held in the registers of the command register 128 corresponding to the authentication phases included in the first authentication (No in S100), the first authentication unit 123 does not perform the first authentication process (S101), and then the authentication engine 122 judges whether or not a command corresponding to the second authentication has been input (Step S103).

When one or more "1"s are not held in the registers of the command register 128 corresponding to the authentication phases included in the second authentication (No in S103), the second authentication unit 124 does not perform the second authentication process (S104), and then the authentication engine 122 judges whether or not a command corresponding to the third authentication has been input (Step S106).

When one or more "1"s are not held in the registers of the command register 128 corresponding to the authentication phases included in the third authentication (No in S106), the third authentication unit 125 does not perform the third authentication process (S107), and the authentication processing is ended.

When the authentication has failed in Step S102, S105 or S108 (No in S102, No in S105 or No in S108), the authentication engine 122 notifies the CPU 110 that the authentication has failed (S109).

Next, flows of the first to third authentication processes (S101, S104 and S107) will be described respectively.

Figure 7:
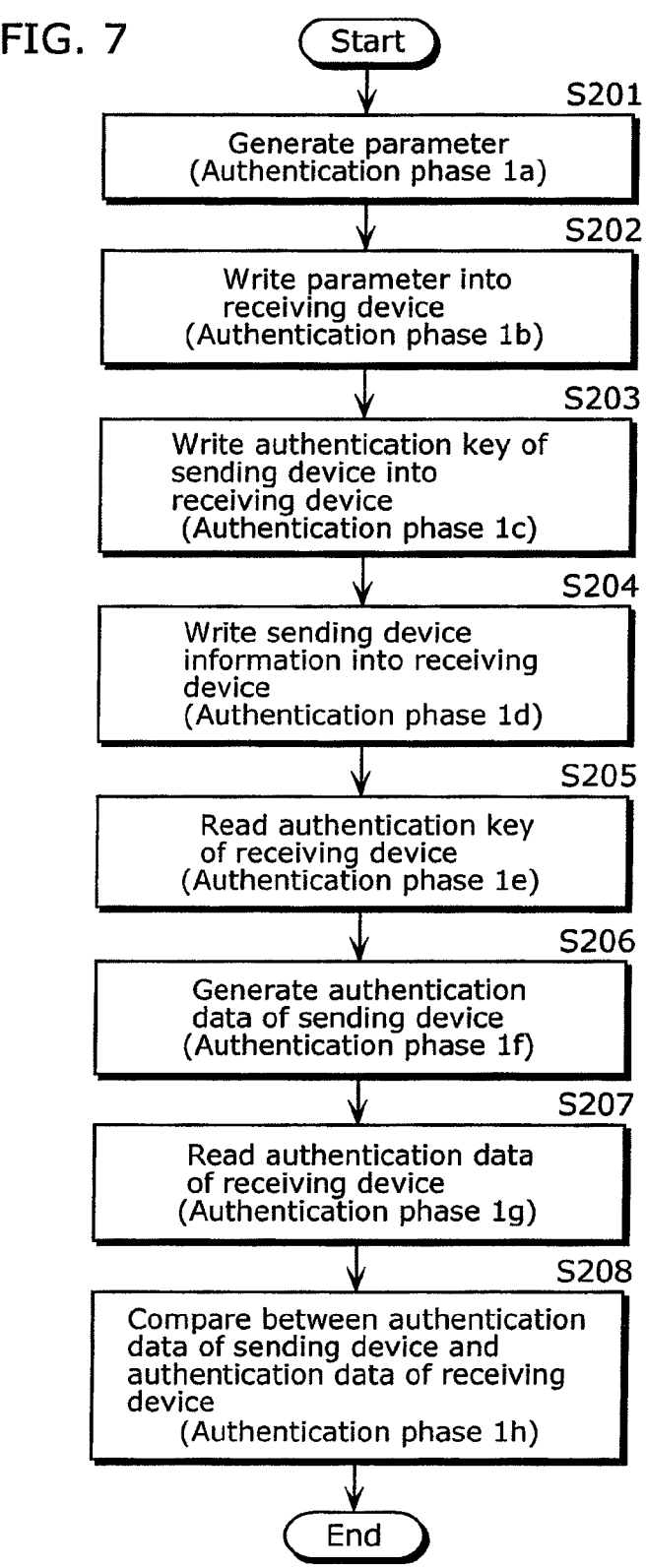
FIG. 7 is a flowchart which shows a flow of the first authentication process.

FIG. 7 is a flowchart which shows a flow of the first authentication process performed by the first authentication unit 123. As shown in FIG. 7, the first authentication unit 123 first generates a parameter, which is temporary unique information used for the following phase of device authentication (S201). Next, the first authentication unit 123 writes the parameter generated in Step S201 into the receiving device 200 (S202), writes an authentication key of the sending device 100 for the first authentication into the receiving device 200 (S203), and writes the information of the sending device 100 into the receiving device 200 (S204). The information of the sending device 100 is information unique to the sending device, which is to be used for the device authentication. Then, the first authentication unit 123 reads the authentication key of the receiving device 200 for the first authentication (S205). Next, the first authentication unit 123 generates authentication data of the sending device 100 for the first authentication (S206), and reads authentication data of the receiving device 200 for the first authentication. The first authentication unit 123 compares the authentication data of the sending device 100 generated in Step S206 with the authentication data of the receiving device 200 read in Step S207 so as to perform the first authentication (S208). Lastly, the first authentication unit 123 notifies the authentication engine 122 of the result of the first authentication.

Figure 8:
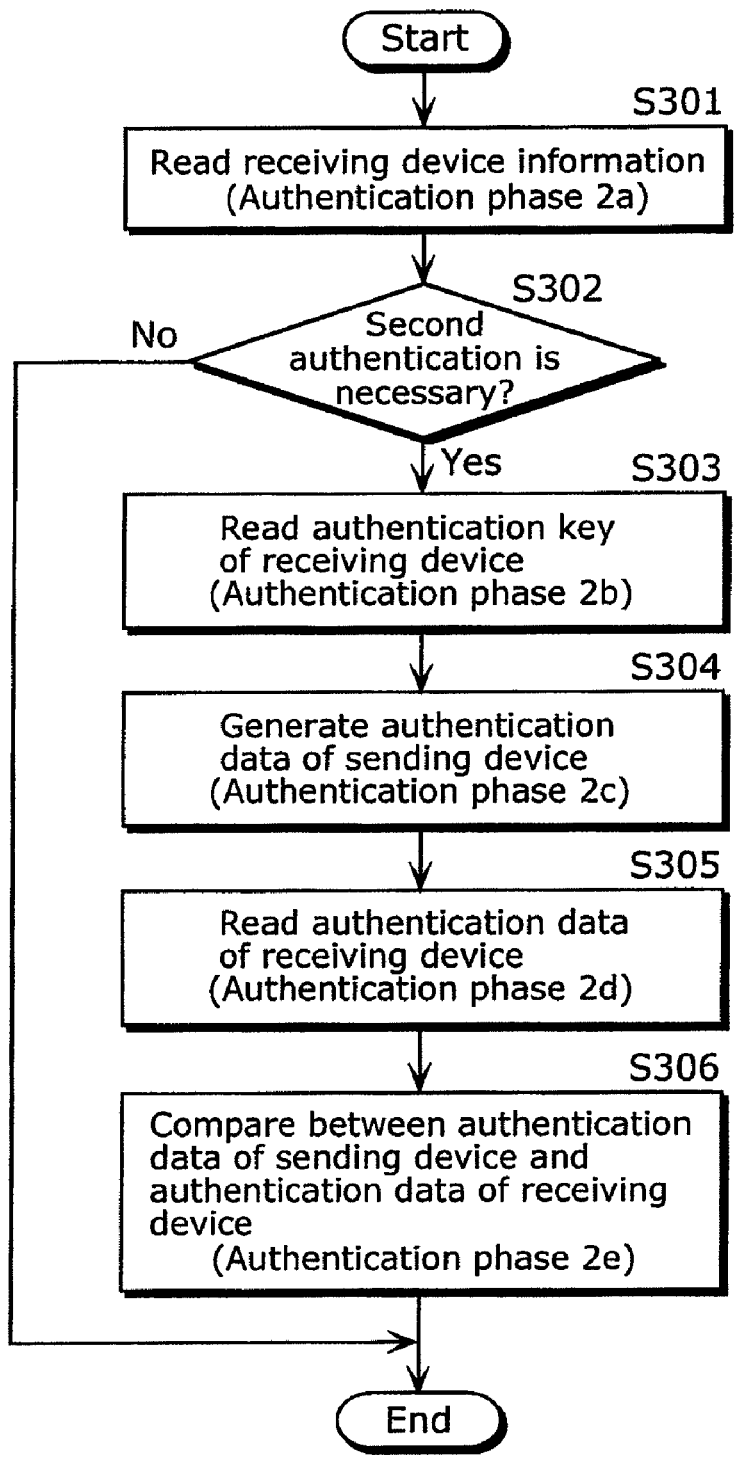
FIG. 8 is a flowchart which shows a flow of the second authentication process.

FIG. 8 is a flowchart which shows the flow of the second authentication process performed by the second authentication unit 124. As shown in FIG. 8, the second authentication unit 124 first reads the information of the receiving device 200 (S301). The information of the receiving device 200 read by the second authentication unit 124 is information unique to the receiving device and is held by the receiving device. The second authentication unit 124 judges, based on the information read in Step S301, whether or not the second authentication is necessary (S302). When the second authentication is necessary (Yes in S302), the second authentication unit 124 reads an authentication key of the receiving device 200 for the second authentication (S303), generates the authentication data of the sending device 100 for the second authentication (S304), and reads an authentication data of the receiving device 200 for the second authentication (S305). The second authentication unit 124 compares the authentication data of the sending device 100 generated in Step S304 with the authentication data of the receiving device 200 read in Step S305 so as to perform the second authentication (S306). Lastly, the second authentication unit 124 notifies the authentication engine 122 of the result of the second authentication.

Figure 9:
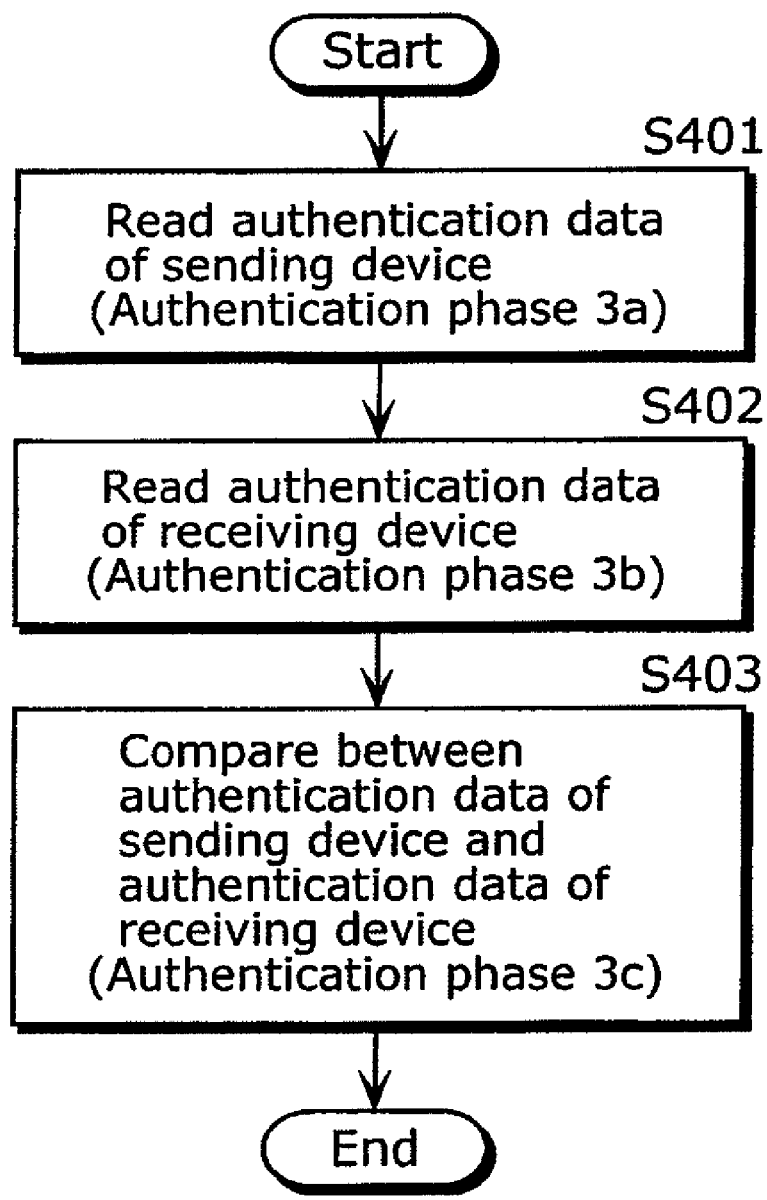
FIG. 9 is a flowchart which shows a flow of the third authentication process.

FIG. 9 is a flowchart which shows the flow of the third authentication process performed by the third authentication unit 125. As shown in FIG. 9, the third authentication unit 125 first reads authentication data of the sending device 100 for the third authentication. Next, the third authentication unit 125 reads authentication data of the receiving device 200 for the third authentication. The third authentication unit 125 compares the authentication data of the sending device 100 read in Step S401 with the authentication data of the receiving device 200 read in Step S402 so as to perform the third authentication (S403). Lastly, the third authentication unit 125 notifies the authentication engine 122 of the result of the third authentication.

The case where all the authentication phases of the first through third authentication processes are executed has been described with reference to FIGS. 7 to 9. Processing performed in each authentication phase shown in FIGS. 7 to 9 will be described below in detail.

Figure 10:
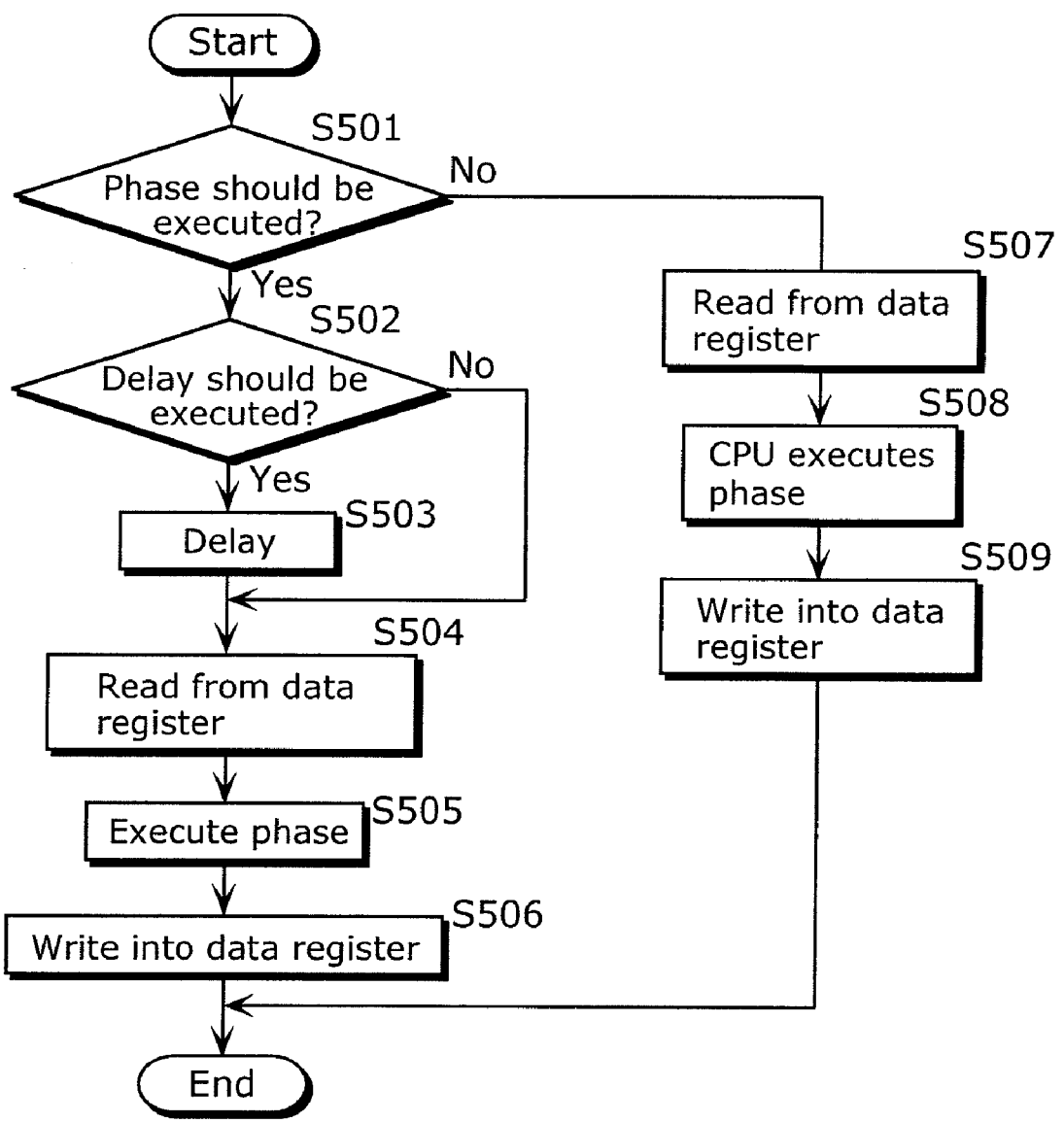
FIG. 10 is a flowchart which shows a flow of processing performed in each authentication phase.

FIG. 10 is a flowchart which shows the flow of processing performed in each authentication phase. The flow of processing performed in the authentication phase 1b (S202) shown in FIG. 7 will be described as an example. It should be noted that similar processing is performed in other authentication phases.

As shown in FIG. 10, the authentication engine 122 first judges whether or not to execute the authentication phase 1b (S501). More specifically, the authentication engine 122 checks the data held in the register (bit 1) of the command register 128 corresponding to the authentication phase 1b.

When the data held in the register (bit 1) corresponding to the authentication phase 1b is "1" (Yes in S501), the authentication engine 122 then judges whether or not to insert a delay between the authentication phases 1a and 1b (S502). More specifically, the authentication engine 122 checks the data held in the register (bit 16) of the command register 128 corresponding to the delay between the authentication phases 1a and 1b.

When the data held in the register (bit 16) corresponding to the delay between the authentication phases 1a and 1b is "1" (Yes in S502), the authentication engine 122 reads, from the timer register 129, timer information corresponding to the delay between the authentication phases 1a and 1b, and controls the timer unit 126 based on the read timer information. The timer unit 126 counts delay time indicated by the timer information. The authentication engine 122 stands by without performing the next processing during the delay counted by the timer unit 126 (S503). After the delay generated by the timer unit 126, the authentication engine 122 reads, from the data register 130, authentication data generated in the authentication phase before the authentication phase 1b (for example, a parameter generated in the authentication phase 1a) (S504). Next, the authentication engine 122 causes the first authentication unit 123 to execute the authentication phase 1b (to write the parameter read in Step S504 into the receiving device 200) (S505). On the other hand, when the data held in the register (bit 16) corresponding to the delay between the authentication phases 1a and 1b is "0" (No in S502), the delay is not executed. Instead, the authentication engine 122 reads, from the data register 130, the data generated in the authentication phase 1a (S504), and causes the first authentication unit 123 to execute the authentication phase 1b (S505).

After the authentication phase 1b is executed in Step S505, the authentication engine 122 writes the data generated in the authentication phase 1b (such as an authentication key, a parameter, and the like) into the data register 130 for the processing of the subsequent authentication phases (S506). After Step S506, the authentication phase 1c (S203) shown in FIG. 7 is executed. It should be noted that the processing shown in FIG. 10 is also executed in the authentication phase 1c, as is the case with the authentication phase 1b.

On the other hand, when the data held in the register (bit 1) corresponding to the authentication phase 1b is "0" (No in Step S501), the authentication phase 1b is performed by software processing by the CPU 110. First, the CPU 110 reads the data generated in the authentication phase before the authentication phase 1b and held in the data register 130 (S507). Next, the CPU 110 performs the authentication phase 1b by software processing using the read data (S508). The CPU 110 writes the data generated in the authentication phase 1b (S508) into the data register 130 for the processing of the subsequent authentication phases (S509).

When data is sent and received to and from the receiving device 200 via DDC communication during the processing of each authentication phase performed by the CPU 110 or the authentication processing apparatus 120, the reset generation unit 131 refers to the information held in the command register 128 indicating whether or not to issue a DDC reset command (bits 29 to 31 of the command register 128 in FIG. 3). When the bit 29 of the command register 128 is "1", the reset generation unit 131 does not issue the DDC reset command for the DDC communication with the receiving device 200. When the bit 30 of the command register 128 is "1", the reset generation unit 131 issues the DDC reset command of 9 clocks for the DDC communication with the receiving device 200. When the bit 31 of the command register 128 is "1", the reset generation unit 131 issues the DDC reset command of 18 clocks for the DDC communication with the receiving device 200. It should be noted that the reset generation unit 131 may check the information which is held in the command register 128 and indicates whether or not to issue a DDC reset command, for every DDC communication with the receiving device 200. Or the reset generation unit 131 may acquire the information indicating whether or not to issue a DDC reset command when an authentication command is sent from the CPU 110, and hold the information in the register or the like within the reset generation unit 131 itself or the DDC unit 127. The reset generation unit 131 may check or acquire the information indicating whether or not to issue a DDC reset command, via the authentication engine 122, under the control of the authentication engine 122.

As described above, the authentication processing apparatus 120 according to the present embodiment is capable of performing, by hardware processing, an arbitrary authentication phase indicated by an arbitrary authentication process according to the authentication command held in the command register 128. Therefore, it is possible to increase processing speed compared with the case where all the authentication phases are performed by software processing. In addition, since hardware processing of an authentication phase is completed within the authentication processing apparatus 120, there is no need to send and receive data which is currently being processed to and from the CPU 110 via DDC communication. Therefore, it is possible to speed up authentication processing.

The CPU 110 performs, by software processing, an authentication phase which is indicated by the authentication command in the command register 128 that it is not to be performed by hardware processing. Therefore, it is possible to perform, by software processing, the authentication phases which cannot be properly performed by hardware processing due to the specifications of the receiving device 200. It is also possible to insert a delay if the delay is needed between authentication phases due to the specifications of the receiving device 200. Therefore, the CPU 110 does not need to insert a delay by software processing, and thus processing can be speeded up.

The data register 130 holds authentication data (a key, a parameter, and so forth) generated in the processing of the authentication phases by the CPU 110. Therefore, the first authentication unit 123, the second authentication unit 124 or the third authentication unit 125 can read the authentication data held in the data register 130, and easily perform, by hardware processing, the authentication phase subsequent to the authentication phase which the CPU 110 has already performed by software processing, using the read authentication data. The data register 130 also holds authentication data generated in the processing of authentication phases by the first authentication unit 123, the second authentication unit 124, or the third authentication units 125. Therefore, the CPU 110 can read the authentication data held in the data register 130, and easily perform, by software processing, the authentication phase subsequent to the authentication phase which one of the first, second and third authentication units 123, 124 and 125 has already performed by hardware processing, using the read authentication data. As described above, the authentication processing apparatus 120 according to the present embodiment can support various types of receiving devices.

It should be noted that in FIG. 10, the authentication engine 122 may read data from the data register 130 (S504) at any arbitrary time after the execution of an authentication phase is determined (Yes in S501) but before the actual execution of the authentication phase (S505). For example, the authentication engine 122 may read the data before judgment of whether or not to execute delay (S502) after the execution of the authentication phase is determined (Yes in S501), or at the same time as the judgment of whether or not to execute delay (S502) or the execution of delay (S503).

In FIG. 10, judgment of whether or not to execute delay and the execution of delay (S502 and S503) are performed before the execution of an authentication phase (S505). However, the judgment of whether or not to execute delay between the current authentication phase and the next authentication phase (delay between the authentication phase 1b and the authentication phase 1c in the above example) and the execution of the delay may be performed after the execution of the authentication phase (S505) or writing of data into the data register 130 (S506).

There are some cases where there is no need to perform reading and writing of authentication data from and into the data register 130 (S504, S506, S507 and S509) depending on the details of the authentication phase. In the processing of the authentication phase in which authentication data does not need to be read and written from and into the data register 130, any one or more of Steps S504, S506, S507 and S509 may be omitted.

In the authentication processing of the present embodiment, a combination of hardware processing by the authentication processing apparatus 120 and software processing by the CPU 110 is used. In such a combined use of hardware processing and software processing, the CPU 110 needs to perform processing for judging which of the hardware processing and the software processing should be performed on which authentication phase.

Such judgment processing as one of the operations in the authentication processing of the present embodiment will be described below. In the judgment processing of the present embodiment, the best authentication command pattern is stored for each receiving device to be authenticated. For a newly connected receiving device (for which the best authentication command pattern is not stored), a technique for judging the authentication commands pattern which allows proper authentication and storing the judgment result is used.

Figure 11:
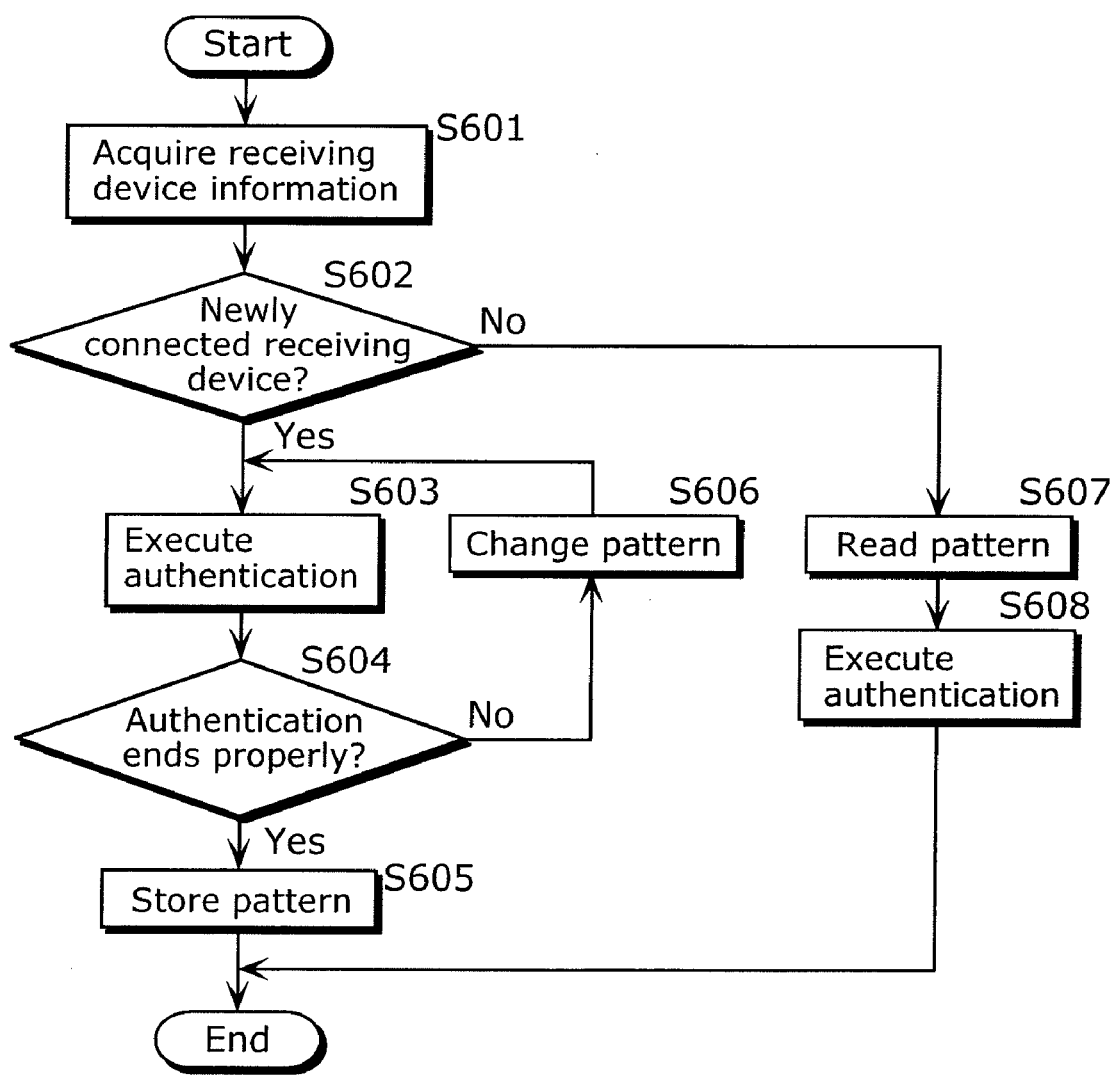
FIG. 11 is a flowchart which shows a flow of judgment processing.

FIG. 11 is a flowchart which shows the flow of judgment processing in the present embodiment. As shown in FIG. 11, the CPU 110 first acquires device information for identifying the type of the receiving device 200 (S601). It should be noted that if the authentication processing of the receiving device 200 includes an authentication phase for acquiring the device information thereof, such information does not need to be acquired separately from the authentication processing, and the device information acquired during the authentication processing can be used. Next, the CPU 110 compares the device information acquired in Step S601 with a number of pieces of device information of receiving devices stored in the storage unit 140 so as to judge whether or not the receiving device 200 is a newly connected device (S602). When the receiving device 200 is a newly connected one (Yes in S602) because the storage unit 140 does not store the device information corresponding to the receiving device 200, the authentication processing apparatus 120 executes the authentication processing according to the instruction of the CPU 110 (S603). For example, the authentication processing apparatus 120 performs hardware processing on all the authentication phases without delay. When the authentication processing (S603) ends properly (Yes in S604), the CPU 110 causes the storage unit 140 to store the pattern of processing (pattern of the authentication command) executed in Step S603 in association with the device information of the receiving device 200 acquired in Step S601 (S605).

On the other hand, when the authentication processing in Step S603 does not end properly (No in Step S604), the CPU 110 changes the pattern of the authentication processing (S606), and then executes the authentication processing again (S603). The change in the authentication processing pattern in Step S606 includes, for example, insertion of delays in between respective authentication phases, software processing by the CPU 110 on an authentication phase which has been performed by hardware processing, change in the details of software processing on an authentication phase which has been performed by software processing by the CPU 110.

When the authentication processing ends properly using a new authentication command pattern changed in Step S606 (Yes in S604), the storage unit 140 stores this new processing pattern changed in Step S606 (S605).

On the other hand, when the authentication processing does not end properly using the new authentication command pattern changed in Step S606 (No in S604), the processing pattern is changed again (S606), and then the authentication processing is executed (S603). In the case of No in S604, the processing in Step S606, Step S603 and Step 604 is repeated until the authentication processing ends properly. It should be noted that the processing may be ended as being impossible to authenticate after repeating the pattern change and the execution of authentication a predetermined number of times.

In the case where the receiving device 200 is not a newly connected device because the storage unit 140 stores the device information of the receiving device 200 (No in Step S602), the CPU 110 reads, from the storage unit 140, the authentication command pattern which is suitable for the receiving device 200. The CPU 110 performs each authentication phase or controls the authentication processing apparatus 120 in Step S608 to perform each authentication phase based on the authentication command pattern read in Step S607.

As described above, the sending device 100 including the authentication processing apparatus 120 of the present embodiment stores, in the storage unit 140 of itself, device information for identifying a receiving device as well as the best authentication command corresponding to the device information. The CPU 110 acquires the device information of the receiving device 200 to be authenticated, and reads the best authentication command corresponding to the acquired device information from the storage unit 140. The CPU 110 writes the read authentication command into the command register 128. Therefore, the authentication processing apparatus 120 can perform authentication processing using the best authentication command pattern which is written in the command register 128 and is suitable for the receiving device. Therefore, it is possible to easily execute the best authentication processing suitable for the receiving device. In the case where the best authentication command pattern for a receiving device is not stored in the storage unit 140, the best authentication command pattern is judged for the receiving device. Thereby the authentication processing apparatus of the present invention can support various types of receiving devices.

It should be noted that the method for judgment processing is not limited to the method shown in FIG. 11. For example, it is acceptable not to judge the best authentication command pattern for a new receiving device but instead to judge the authentication command pattern suitable for the receiving device 200 based on a table indicating a number of pieces of device information of receiving devices and authentication command patterns which are previously stored in the storage unit 140. For example, the table is acquired in one of the following manners: the table is stored when the sending device is shipped; the table is input to the sending device 100 from outside; the sending device 100 acquires the table via the Internet or the like; and the receiving device 200 holds the pattern information of its own processing and the sending device 100 acquires the information of the authentication command pattern from the receiving device 200. After the table is acquired, the processing shown in FIG. 11 may be performed so as to update the table.

In FIG. 2, the storage unit 140 is provided separately from the authentication processing apparatus 120, but the authentication processing apparatus 120 may include the storage unit 140 as a semiconductor integrated circuit of one chip.

In the above description, the storage unit 140 stores the authentication command pattern suitable for a receiving device, but the pattern judgment shown in FIG. 11 (processing after Yes in Step S602) may be performed every time without storing the authentication command pattern.

When a receiving device is not a newly connected one (No in S602), the processing for judging whether or not authentication ends properly (S603 to S606) may be performed after the authentication command pattern is read (S607), as is the case with the newly connected receiving device (Yes in S602).

In the above description, the CPU 110 performs software processing, but the authentication processing apparatus 120 may include a dedicated microcomputer for performing software processing. Furthermore, this microcomputer may perform a part of the processing or the entire processing, such as judgment processing, performed by the CPU 110 in the above description.

In the case where the best authentication command pattern for each receiving device includes software processing by the CPU 110, the storage unit 140 may store the information of the software processing for each receiving device.

As described above, the authentication processing apparatus 120 according to the present embodiment is capable of holding an authentication command sent from the CPU 110 in the command register 128 and selectively executing processing of an authentication phase included in authentication processing according to the held authentication command. Since such an authentication command includes 1-bit information corresponding to each authentication phase, the authentication processing apparatus 120 can easily judge whether or not to execute an arbitrary authentication phase based on one command and thus selectively execute the arbitrary authentication phase.

The authentication command also includes 1-bit information indicating whether or not to insert a delay between respective authentication phases. Therefore, the authentication processing apparatus 120 can easily judge whether or not to insert a delay between arbitrary authentication phases and thus actually insert the delay between them.

The authentication command also includes information indicating whether or not to issue a DDC reset command to the receiving device 200. Therefore, the authentication processing apparatus 120 can easily judge whether or not to issue a DDC reset command and thus actually issue the DDC reset command to the receiving device 200.

The authentication processing apparatus 120 according to the present embodiment is capable of performing by hardware processing an arbitrary authentication phase included in an arbitrary authentication command, according to the authentication command held in the command register 128. Therefore, it is possible to increase processing speed compared with the case where all the authentication phases are performed by software processing. In addition, since hardware processing of an authentication phase is completed within the authentication processing apparatus 120, there is no need to send and receive data which is currently being processed to and from the CPU 110 via DDC communication. Therefore, it is possible to speed up authentication processing.

The CPU 110 can perform by software processing the authentication phases which cannot be properly performed by hardware processing due to the specifications of the receiving device 200. It is also possible to insert a delay if the delay is needed between authentication phases due to the specifications of the receiving device 200. Therefore, the CPU 110 does not need to insert a delay by software processing, and thus processing can be speeded up.

The data register 130 holds authentication data (a key, a parameter, and so forth) generated in the processing of authentication phases by the authentication processing apparatus 120 or the CPU 110. Therefore, the CPU 110 can easily perform by software processing the authentication phases which have already been performed by hardware processing by the authentication processing apparatus 120, using the authentication data held in the data register 130. On the other hand, the authentication processing apparatus 120 can easily perform by hardware processing the authentication phases which have already been performed by software processing by the CPU 110, using the authentication data held in the data register 130.

The authentication processing of the present embodiment is performed using the best authentication command pattern for a receiving device stored in the storage unit 140. Therefore, it is possible to easily execute the best authentication processing for the receiving device. In the case where the best authentication command pattern for a receiving device is not stored in the storage unit 140, the best authentication command pattern is judged for the receiving device. Thereby the authentication processing apparatus of the present invention can support various types of receiving devices.

As described above, the present invention can provide an authentication processing apparatus and an authentication processing method which allow high-speed processing and support various types of receiving devices.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention can be applied to authentication processing apparatuses and authentication processing methods, and particularly to audio-video equipment having an audio-video output function, such as DVD players, DVD recorders, set top boxes (STB) and the like, personal computers, and so forth.

What is claimed is:

1. An authentication processing apparatus comprising:
an authenticator having a circuit that performs authentication phases included in processing for authenticating an external device;
a command holder operable to hold a first command that indicates whether or not each of the authentication phases is performed by said authenticator;
an authentication controller operable to cause said authenticator to perform the authentication phases that are indicated, by the first command, to be performed by said authenticator; and
a central processing unit (CPU) operable to perform software processing of the authentication phases that are indicated, by the first command held in said command holder, not to be performed by said authenticator,
wherein the first command includes a plurality of bits, each corresponding to one of the authentication phases,
wherein each of the bits included in the first command indicates whether or not the corresponding authentication phase is to be performed by the authenticator, and
wherein said authentication controller is operable to cause said authenticator to perform the authentication phase that is indicated, by the corresponding bit included in the first command held in said command holder, to be performed by said authenticator.

2. The authentication processing apparatus according to claim 1, further comprising
a data holder operable to hold, for a subsequent authentication phase, authentication data generated in an authentication phase performed by said authenticator.

3. The authentication processing apparatus according to claim 2,
wherein said authenticator is operable to read, from said data holder, authentication data generated in a previous authentication phase, and to perform an authentication phase using the authentication data.

4. The authentication processing apparatus according to claim 3,
wherein said data holder is operable to hold, for a subsequent authentication phase, authentication data generated in the authentication phase performed by said CPU, and said CPU is operable to read, from said data holder, authentication data generated in a previous authentication phase, and to perform software processing of an authentication phase using the authentication data.

5. The authentication processing apparatus according to claim 1, further comprising
a display data channel (DDC) communicator operable to perform DDC communication with the external device,
wherein said authenticator is operable to send and receive data to and from the external device via said DDC communicator.

6. The authentication processing apparatus according to claim 5,
wherein said command holder is operable to hold a second command that indicates whether or not a DDC communication line connected with the external device is to be reset, and
said DDC communicator includes a reset generator operable to generate a signal for resetting the DDC communication line based on the second command held in said command holder.

7. The authentication processing apparatus according to claim 1,
wherein said command holder is operable to hold a third command that indicates whether or not a delay time is to be inserted between the respective authentication phases,
said authentication processing apparatus further comprises a timer operable to count the delay time, and
wherein said authentication controller is operable to insert the delay time counted by said timer between authentication phases indicated by the third command as authentication phases between which a delay time is to be inserted.

8. The authentication processing apparatus according to claim 1, further comprising:
a storage operable to store device information that identifies the external device and the first command that corresponds to the external device;
a device information acquirer operable to acquire the device information of the external device to be authenticated; and
a device information controller operable to read, from said storage, the first command that corresponds to the device information acquired by said device information acquirer, and to write the first command into said command holder.

9. The authentication processing apparatus according to claim 1,
wherein the processing for authenticating the external device is compliant with a high-bandwidth digital content protection (HDCP) standard, and
said authenticator includes:
a first authenticator having a circuit that performs an authentication phase included in a first authentication process which is compliant with the HDCP standard;
a second authenticator having a circuit that performs an authentication phase included in a second authentication process which is compliant with the HDCP standard; and
a third authenticator having a circuit that performs an authentication phase included in a third authentication process which is compliant with the HDCP standard.

10. An authentication processing method used in an authentication processing apparatus including an authenticator having a circuit that performs authentication phases included in processing for authenticating an external device, a command holder operable to hold a first command that indicates whether or not each of the authentication phases is to be performed by the authenticator, the first command including a plurality of bits, each bit corresponding to one of the authentication phases and indicating whether or not the corresponding authentication phase is to be performed by the authenticator, and a central processing unit (CPU), the method comprising:
judging, based on the first command, whether or not each of the authentication phases is to be performed by the authenticator, wherein an authentication phase is judged to be performed by the authenticator if the phase is indicated, by the corresponding bit included in the first command held in the command holder, to be performed by the authenticator;
causing the authenticator to perform the authentication phases that are judged to be performed by the authenticator; and
causing the CPU to perform software processing of the authentication phases that are judged not to be performed by the authenticator.

* * * * *